(12) United States Patent
Chen et al.

(10) Patent No.: US 8,666,979 B2
(45) Date of Patent: Mar. 4, 2014

(54) RECOMMENDING INTERESTING CONTENT USING MESSAGES CONTAINING URLS

(75) Inventors: Jilin Chen, Minneapolis, MN (US);
Rowan Nairn, San Francisco, CA (US);
Lester D. Nelson, Santa Clara, CA (US);
Ed H. Chi, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 375 days.

(21) Appl. No.: 12/757,929

(22) Filed: Apr. 9, 2010

(65) Prior Publication Data

US 2011/0252027 A1    Oct. 13, 2011

(51) Int. Cl.
*G06F 17/30* (2006.01)
*G06Q 99/00* (2006.01)

(52) U.S. Cl.
USPC .......................... 707/732; 707/754; 705/319

(58) Field of Classification Search
USPC .................................. 707/732, 754; 705/319
See application file for complete search history.

(56) References Cited

U.S. PATENT DOCUMENTS

| | | | |
|---|---|---|---|
| 7,890,505 B1* | 2/2011 | Alspector et al. | 707/731 |
| 8,176,046 B2* | 5/2012 | Druzgalski et al. | 707/731 |
| 8,224,755 B2* | 7/2012 | Goodman et al. | 705/317 |
| 8,515,888 B2* | 8/2013 | Ventilla et al. | 706/45 |
| 2008/0005073 A1* | 1/2008 | Meek et al. | 707/3 |
| 2009/0254838 A1 | 10/2009 | Rao et al. | |
| 2010/0023506 A1 | 1/2010 | Sahni et al. | |
| 2010/0312769 A1* | 12/2010 | Bailey et al. | 707/740 |
| 2011/0078306 A1* | 3/2011 | Krishnamurthy | 709/224 |
| 2011/0145348 A1* | 6/2011 | Benyamin et al. | 709/206 |
| 2011/0231381 A1* | 9/2011 | Mercuri | 707/706 |
| 2013/0013807 A1* | 1/2013 | Chrapko et al. | 709/238 |

FOREIGN PATENT DOCUMENTS

| | | | | |
|---|---|---|---|---|
| EP | 2375351 B1 * | 7/2013 | | G06F 17/30 |
| WO | WO 2011/050495 A1 * | 5/2011 | | G06F 17/00 |

OTHER PUBLICATIONS

Badrul M. Sarwar et al., "Recommender Systems for Large-scale E-commerce: Scalable Neighborhood Formation Using Clustering", 2002, Fifth International Conference on Computer and Information Technology, 6 pages.*

Reid Anderson et al., "Trust-Based Recommendation Systems: an Axiomatic Approach", Apr. 21-25, 2008, ACM WWW 2008, pp. 199-208.*

(Continued)

*Primary Examiner* — Rehana Perveen
*Assistant Examiner* — Scott A Waldron
(74) *Attorney, Agent, or Firm* — Patrick J. S. Inouye; Krista A. Wittman

(57) ABSTRACT

A system and method for recommending interesting content is provided. A content profile including a vector of words extracted from messages associated with a user is obtained. One or more content pointer profiles each including a vector of words associated with a content pointer located within one or more messages are obtained. The content profile is compared with each of the content pointer profiles. A relevance score is determined for that content pointer by calculating a similarity between the user words and the content pointer words. The content pointers are ranked based on the relevance score. A threshold is applied to select the content pointers and those content pointers that satisfy the threshold are selected as the content pointers most relevant to the user.

16 Claims, 10 Drawing Sheets

(56) References Cited

OTHER PUBLICATIONS

Jilin Chen et al., "'Make New Friends, but Keep the Old'—Recommending People on Social Networking Sites", Apr. 4-9, 2009, ACM CHI 2009, pp. 201-210.*

Hill et al., "Using Frequency-Of-Mention in Public Conversations for Social Filtering." In Proc. of CSCW 1996.

Weng et al., "TwitterRank: Finding Topic-sensitive Influential Twitterers," Proceedings of the Third ACM International Conference on Web Search and Data Mining, pp. 261-270 (Jan. 1, 2010-Feb. 6, 2010).

Phelan et al., "Using Twitter to Recommend Real-Time Topical News," Proceedings of the Third ACM Conference on Recommender Systems, pp. 385-388 (Jan. 1, 2009).

* cited by examiner

RECOMMENDING INTERESTING CONTENT USING MESSAGES CONTAINING URLS

FIELD

This application relates in general to recommender systems and, in particular, to a system and method for recommending interesting content in an information stream.

BACKGROUND

Currently, communication can occur through many mediums, including email, online news services, feeds, instant messaging, texting, and social networking sites. Social networking sites, such as Facebook, Twitter, or Google Reader, provide communication through streams of messages, which are either composed by, or transmitted to, a user. Many of the social networking sites limit the number of characters in each text entry, which can result in multiple messages regarding a single topic. Individuals interact with the user by subscribing to the user's stream or by transmitting a text entry to the user.

As the popularity of social networking sites increases, the number of messages transmitted daily also increase. For example, the number of tweets transmitted per hour via Twitter ranges from 400,000 to 1,400,000. Due to the number of messages transmitted, users are having difficulty reviewing all the messages received. Sorting through and reviewing received messages can be very time consuming, especially after a long period of time away. Many messages received are related to social aspects, rather than substantive interesting information. The messages can include links to photographs, articles, or other Websites, which can include substantively relevant and interesting information. However, failure to review all messages can result in missing important or interesting information.

Attempts to generate recommendations from explicit social information have been made, such as by Hill et al. in "Using Frequency-Of-Mention In Public Conversations For Social Filtering." In Proc. of CSCW 1996. A social filtering system that recommends news URLs on Usenet newsgroups is provided. The system works as a within-group popular voice. For example, in each group of content, the most popular URLs are recommended based on a "one person, one vote" basis. The more people in a group who mention a URL, the more likely the URL will be recommended. However, Hill fails to consider relationships between members in the newsgroups.

Therefore, there is a need for proactively providing content recommendations to users, which are selected from an information stream.

SUMMARY

An embodiment provides a method for recommending interesting content in an information stream. A content profile including a vector of words extracted from messages associated with a user is obtained. One or more content pointer profiles each including a vector of words associated with a content pointer located within one or more messages are obtained. The content profile is compared with each of the content pointer profiles. A relevance score is determined for that content pointer by calculating a similarity between the user words and the content pointer words. The content pointers are ranked based on the relevance score. A threshold is applied and those content pointers that satisfy the threshold are selected as the content pointers most relevant to the user.

A further embodiment provides a method for recommending interesting content. Messages each including a content pointer is identified from a neighborhood of individuals associated with a user. A composition power is assigned to each of the individuals based on a frequency of messages generated by that individual. A trust power is assigned to each of the individuals based on a trustworthiness of that individual. A vote power is determined for each individual by combining the vote score and the trust score. A vote score is generated for each of the content pointers by summing the vote power for those individuals associated with the messages that include that content pointer. A threshold is applied to the vote scores and those content pointers that satisfy the threshold are selected as recommendations.

An even further embodiment provides a method for identifying interesting content. A set of candidate content pointers selected from messages within one or more information streams is generated. A relevance score for each of the candidate content pointers is determined based on an interest of a user. A vote score for each of the candidate content pointers is determined based on individuals associated with the user. The relevance scores and the vote scores are combined for each of the candidate content pointers as a combined score. The candidate content pointers are ranked based on the combined scores. A threshold is applied to the combined scores and those candidate content pointers that satisfy the threshold are selected as recommendations.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Reviewing and keeping up with information received via messages in a communication medium, such as social networking sites, can be difficult and time consuming due to large amounts of content that is dynamically updated. Providing messages having an interesting or relevant Uniform Resource Locator ("URL") greatly minimizes the time required by a user to locate and review the same information.

Figure 1:
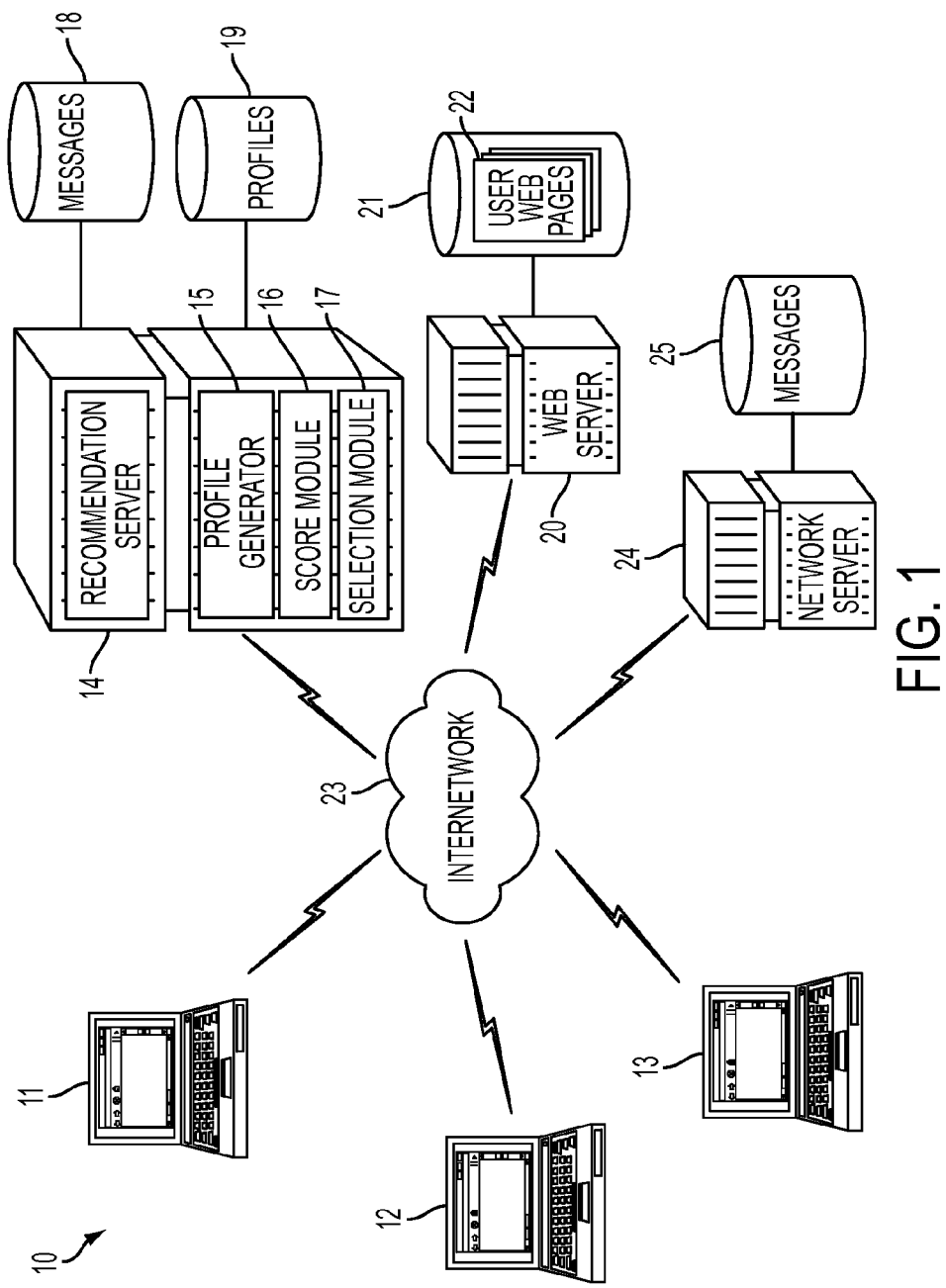
FIG. 1 is a block diagram showing a system for recommending interesting content in an information stream, in accordance with one embodiment.

In social networking sites, such as Twitter, messages are composed and transmitted between a user and other individuals, identified as followers or followees. Followers are registered with and follow another user's account profile. The other user whose account profile is followed is considered the followee. The relationship between followers and followees can be reciprocal or independent. Recommendations for messages with interesting content can be determined based on a particular user's followers and followees. FIG. 1 is a block diagram showing a system 10 for recommending interesting content in an information stream, in accordance with one embodiment. One or more user devices 11-13 are connected to a Web server 20. At least one of the user devices is controlled by a user, whose account profile is reviewed to identify recommendations, while the remaining user devices can be controlled by other users, including the user's followers and followees.

Each of the user devices 11-13 requests a particular Web page 22, such as a social networking page from a Web server 20 via an internetwork 23, including the Internet. A database 21, coupled to the Web server 20, stores Web pages 22 from which, the requested Web page is identified and transmitted back to the user device 11-13. The user device 11-13 displays the requested Web page 22 for review and interaction by a user. When the requested Web page 22 is a social networking site, the user can compose and transmit messages, as well as receive, review, and respond to messages from other users. The messages are transmitted to and received by a network server 24, which is coupled to a database 25 for storing the messages. Additionally, the transmitted and received messages can be provided to the user in an information stream.

The received messages can be generated by other users, such as the user's followers and followees. A follower is a user that subscribes to another user's account profile to follow the interactions of the other user. In contrast, a followee is an individual user who is being followed by a follower. In one embodiment, a follower and a followee are not mutually exclusive. For example, A is a follower of B; however, B is not a follower of A. In a further embodiment, a follower and a followee are mutually exclusive. For instance, A is a follower of B and B is a follower of A. In yet a further embodiment, a followee may be considered a "friend," in accordance with some social networking sites, such as Facebook. The user who is requesting recommendations can be both a follower and a followee of the other users.

Once requested, a recommendation server 14 can obtain messages associated with the user to identify recommendations of messages with content pointers that are considered to be interesting or relevant to the requesting user. A content pointer provides information or access to allow a requesting user to locate particular content, such as via a hyperlink, including a Uniform Resource Locator (URL), or an attachment. Identifying recommendations is described below with reference to URLs as content pointers located within a social networking environment, although other environments and social pointers as possible. Therefore, as used herein, any reference to a "social pointer" or "URL" will be understood to include the other term, except as specifically indicated otherwise. The recommendation server includes a profile generator 15, a score module, 16, and a selection module 17. The profile generator 15 analyzes the obtained messages to generate content profiles and URL profiles. The profiles can be stored in a profile database 19 coupled to the recommendation server 14. The score module 16 accesses one or more of the profiles from the profile database 19 to generate a relevance score for one or more URLs identified in the obtained messages. The relevance scores are provided to the selection module 17, which ranks the URLs based on the associated relevance scores and applies a threshold to the ranked URLs. Those URLs having relevance scores that satisfy the threshold are selected as recommendations for providing to the requesting user via the internetwork 23 on the user device 11-13.

The user devices 11-13, recommendation server 14, Web server 20, and network server 24 each include components conventionally found in general purpose programmable computing devices, such as a central processing unit, memory, input/output ports, network interfaces, and non-volatile storage, although other components are possible. Moreover, other information sources in lieu of or in addition to the servers, and other information consumers, in lieu of or in addition to the user devices, are possible.

Additionally, the user devices 11-13 and servers 14, 20, 24 can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
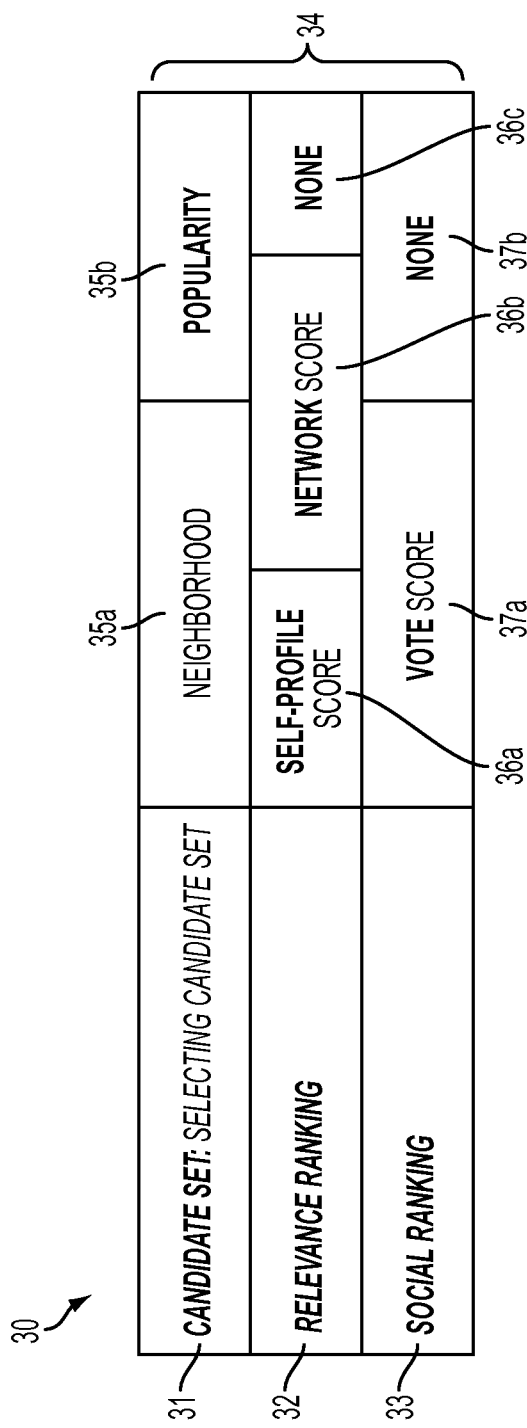
FIG. 2 is a data structure diagram that identifies different combinations of factors for recommending interesting content.

Providing requesting users with recommendations for messages having content pointers, such as URLs, that are considered interesting and relevant information can be helpful and time efficient. A requesting user can avoid having to review each and every text entry and content pointer received to manually identify the interesting and relevant information. To identify URLs as recommendations, different combinations of factors can be considered. FIG. 2 is a data structure diagram 30 that identifies different combinations of factors for recommending interesting content. Three categories 31-33 of factors 34 are considered, including a type of candidate URL set 31, relevance ranking of the URLs in the candidate set 32, and social ranking of the URLs 33. The type of candidate content pointer category 31 can include a neighborhood candidate set 35a, which considers messages from the requesting user's followees and followees-of-followees (FOF), or a popularity candidate set 35b. A FOF has an account profile within a social networking environment that is followed by the requesting user's followee, who in turn in followed by the requesting user. The relevance ranking category 32 ranks content pointers based on a relevance of words and topics identified in messages composed by the requesting user, which is provided as a self-profile score 36a, or by followees and FOFs of the requesting user, which is provided by a network score 36b. Subsequently, one or more of the ranked content pointers can be selected as a recommendation. Additionally, no relevance ranking 36c of the content pointers is required in a further embodiment. The social ranking category 33 scores and ranks content pointers based on social voting power 37a, which considers a trustworthiness of the requesting user's FOFs and a frequency of message generation by each FOF. Also, no social ranking 37b of the content pointers is required in a further embodiment.

Based on the factors described above, at least 12 different methods for identifying content pointers as recommendations can be provided by selecting a factor from each of the categories and then combing the selected factors. For example, the 12 recommendation methods include popular candidate set-no relevance ranking-no social ranking, neighborhood candidate set-no relevance ranking-no social ranking, popular candidate set-network ranking-no social ranking, popular candidate set-self relevance ranking-no social ranking, neighborhood candidate set-network ranking-no social ranking, neighborhood candidate set-self relevance ranking-no social ranking, popular candidate set-no relevance ranking-vote social ranking, popular candidate set-neighborhood relevance ranking-vote social ranking, neighborhood candidate set-network relevance ranking-vote social ranking, popular candidate set-self relevance ranking-vote social ranking, and neighborhood category set-self relevance ranking-vote social ranking. Other methods or combinations of the recommendation factors are possible.

Figure 3:
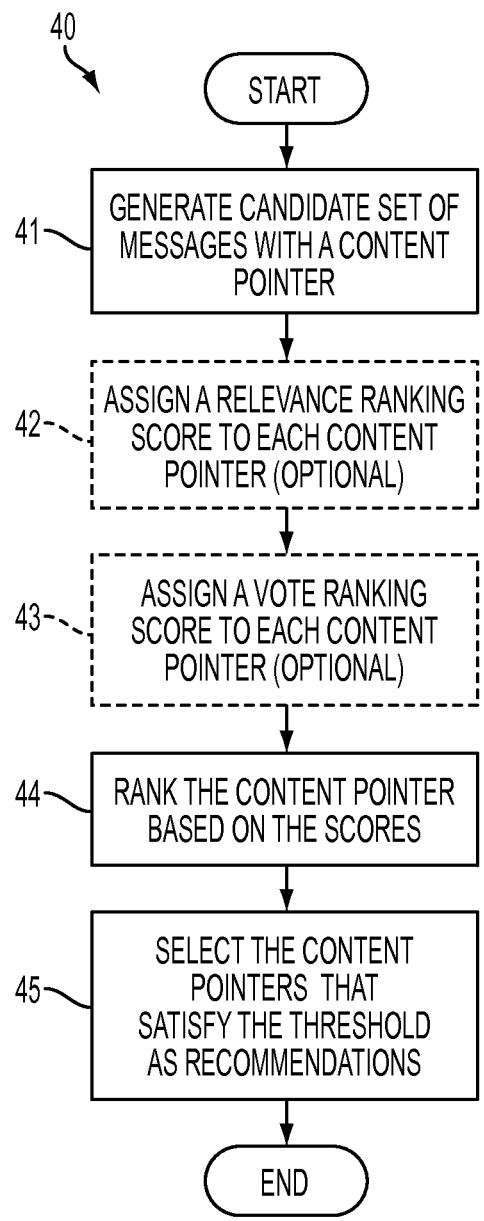
FIG. 3 is a flow diagram showing a method for recommending interesting content in an information stream, in accordance with one embodiment.

Although different factors can be used to select messages with interesting content pointers, such as URLs, as recommendations, a general flow can be identified across all the method scenarios. FIG. 3 is a flow diagram showing a method 40 for recommending interesting content in an information stream, in accordance with one embodiment. A candidate set of messages that each contain a content pointer, such as a URL is generated (block 41) as possible recommendations for providing to a requesting user. The candidate set of messages can be generated based on a neighborhood of the requesting user or based on a popularity of the URL within the social networking site. URLs in a neighborhood candidate set can be selected from messages posted by followees of the requesting user and FOFs. Meanwhile, the URLs in a popular candidate set can be selected from messages transmitted to or from any user registered with the social networking site based on a popularity of the messages. The popularity of a URL can be measured based on a number of messages that contain the URL, which can be determined by the recommendation server described above with reference to FIG. 1, the social networking site, or a third party. In one example, URLs numerously posted are likely to be more interesting than URLs only mentioned in messages by one or two individuals. In one embodiment, the popularity of a URL can be determined over a predetermined time period or through an absolute date. For example, the time period is set as 24 hours and the URLs considered to be the most popular during the 24-hour period are selected for inclusion in the popular candidate set. The most popular URLs can be determined by identifying the number of messages that mentioned each of the URLs during the 24-hour period and then applying a popularity threshold to all the URLs mentioned. If the URLs satisfy the threshold, they are selected for inclusion in the candidate set.

Optionally, the URLs mentioned during the time period may also be required to satisfy a temporal interest threshold prior to inclusion in the candidate set to ensure that each of the URLs is still considered interesting. URLs that fail to satisfy the temporal interest threshold can be considered uninteresting based on a creation date of the messages associated with each URL, despite the popularity of the URL since interesting topics tend to trend over time. The temporal interest threshold can include a predetermined time period, an absolute date, or an undetermined time period, such as the last time the requesting user logged into his account profile. The temporal interest threshold can be set automatically or by the requesting user. For instance, the interesting threshold is set for seven days, which is measured from the date of creation of the messages in which the popular URLs are located. The popular URLs are only selected for inclusion in the popular candidate set if the associated messages were created within the past seven days.

Figure 4:
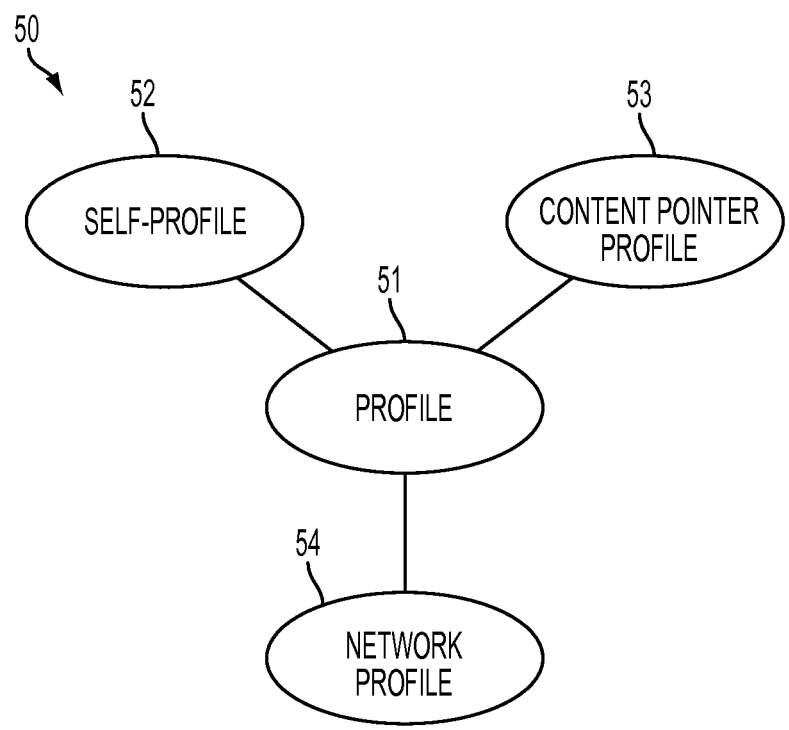
FIG. 4 is a data structure diagram showing types of profiles for use in assigning scores to a content pointer.

Once identified, each candidate URL is optionally assigned a score based on a relevance of that URL to the requesting user (block 42). The relevance score can be based on a similarity of the URL to at least one of the requesting user's interests, interests of the requesting user's followees, trustworthiness of the requesting user's followees, and a frequency of message composition by the followees. FIG. 4 is a data structure diagram 50 showing types of profiles for use in assigning relevance scores 51 to a content pointer. The relevance score can be assigned to a content pointer, such as a URL located in a text entry through profile comparison, poster based scoring, or a combination of the profile comparison and poster based scoring. With profile comparison scoring 51, a URL profile 53 for a particular URL is compared with a content profile 52, 54 of a requesting user to identify a relevance of the URL to the requesting user. The content profile can include a self-profile 52 based on messages about and from the requesting user, and a network profile 54, which is based on the requesting user's followees. Generating self-profiles and network profiles are further discussed below with reference to FIGS. 6 and 7. The relevance can be determined using a cosine similarity. Assigning a relevance score using profile comparison is further discussed below with reference to FIG. 5.

Returning to the discussion with respect to FIG. 3, a social ranking score can be optionally assigned to each of the candidate URLs (block 43). The social ranking score relies on a number of requesting user's followees that commonly follow other individuals and a frequency of messages generated by the other individuals. Social ranking scores are further described below with reference to FIG. 9.

Once determined, the URLs can be ranked based on the assigned scores (block 44). If both a relevance ranking score and a social ranking score have been assigned to a URL, the rank is based on a combination of the relevance score and the vote score for that URL. A ranking threshold is applied to the scores of the ranked URLs and the URLs with scores that satisfy the threshold are selected as recommendations (block 45). The ranking threshold can include an absolute value, a percentage, or a bounded range. For example, an absolute value of four can be applied to the linked URLs to select the four URLs with the highest ranking scores as recommendations. Upon selection, the recommendations can be provided to the requesting user for review. The recommendations can include only the URL, or the URL and the associated messages.

Figure 5:
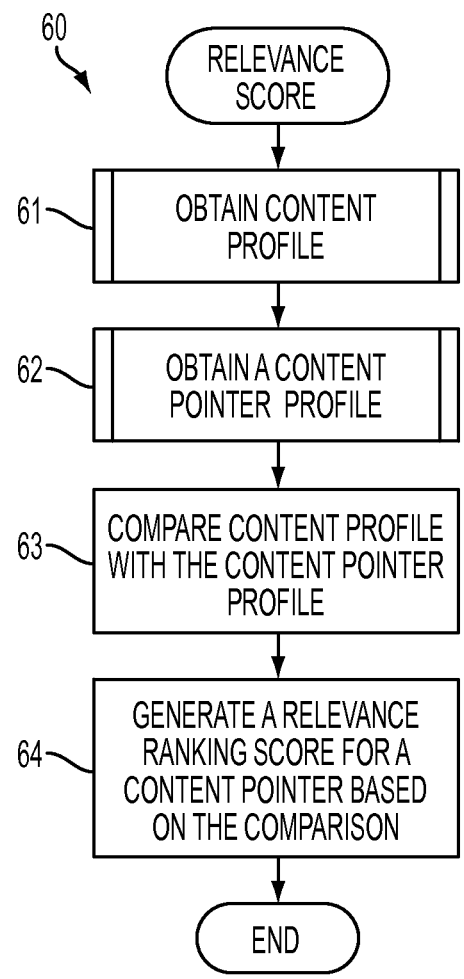
FIG. 5 is a flow diagram showing, by way of example, a method for assigning scores to Uniform Resource Locators (URLs) by comparing profiles.

As described above, the relevance scores can be assigned to the URLs based on content profiles and URL profiles. FIG. 5 is a flow diagram showing, by way of example, a method 60 for assigning scores to URLs by comparing profiles. A content profile is obtained (block 61) and can include a self-profile or a network profile, which can be newly generated, updated, or accessed from a database. Each content profile includes a vector of keywords obtained from messages associated with the URLs. To generate a self-profile, the keywords can be selected from messages from or about the requesting user, while the keywords for a network profile can be selected from self-profiles of the requesting user's followees. Generating self-profiles and network profiles are respectively discussed below with reference to FIGS. 6 and 7.

Next, a profile is obtained for a URL (block 62). In a further embodiment, the content profile and the URL profile are obtained simultaneously or the URL profile can be obtained prior to the content profile. The URL profile can also be newly generated, updated, or accessed from a database. The URL profile includes a vector of keywords selected from one or more of the messages that include the URL. Short message term expansion is used to identify additional keywords for URLs that are only referred by a small member of messages. Term expansion is further described below with reference to FIG. 7. Additionally, URL profiles are further discussed below with reference to FIG. 8.

Once obtained, the content profile, either a self-profile or a network profile, is compared (block 63) with the URL profile to generate a relevance ranking score based on a similarity of the profiles (block 64). The similarity can be determined using cosine similarity. However, other determinations of similarity are possible. As described above with reference to FIG. 3, the generated relevance ranking score is assigned to a URL for ranking and possible selection as a recommendation.

Figure 6:
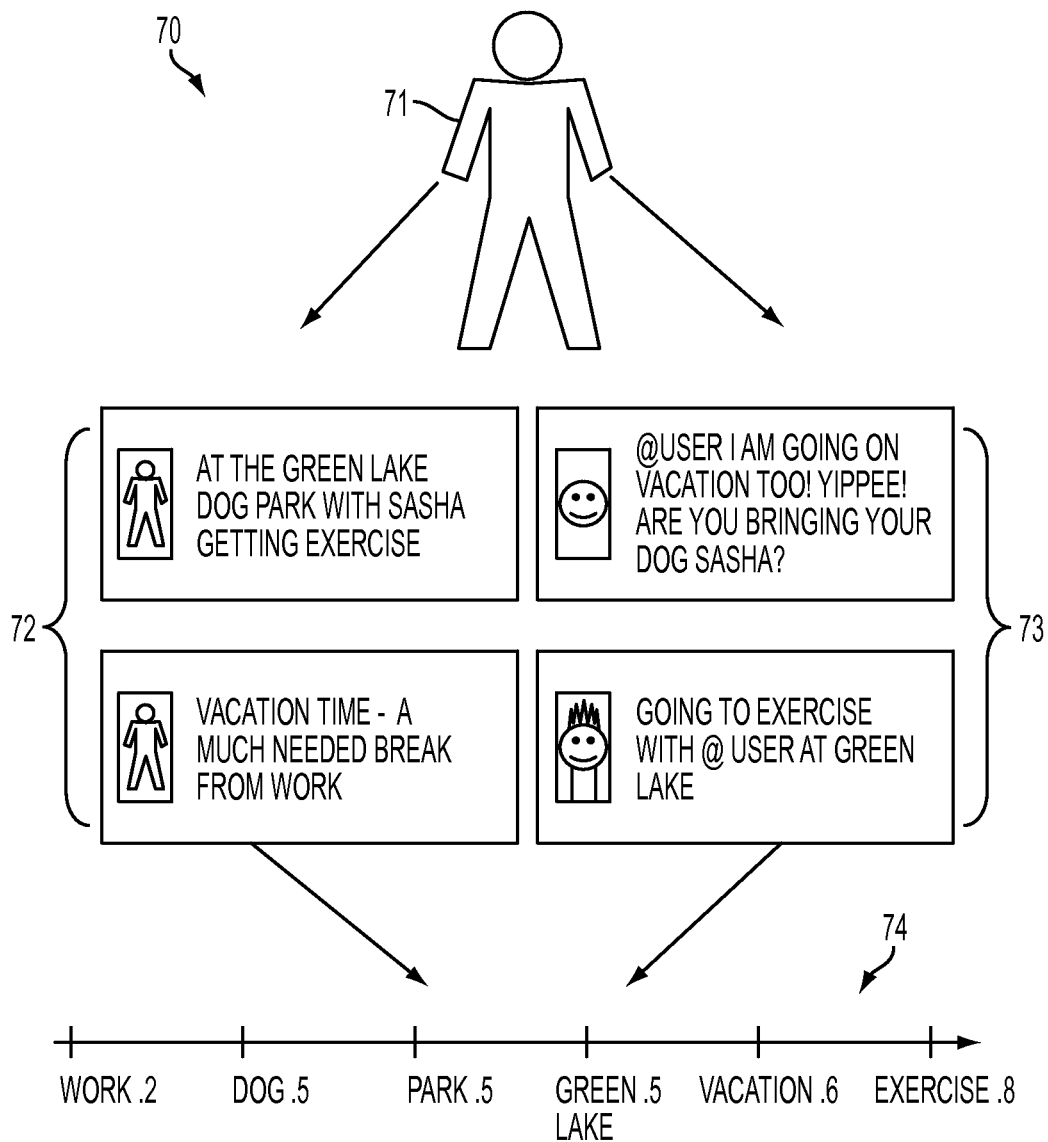
FIG. 6 is a flow diagram showing, by way of example, a method for generating a self-profile.

A content profile can include a self-profile based on messages regarding a requesting user, or a network profile based on followees of the requesting user. FIG. 6 is a flow diagram showing, by way of example, a method 70 for generating a self-profile 74 for a requesting user 71. All messages composed by 72 or that mention 73 the requesting user 71 de identified. For example, two messages composed by the requesting user and two messages regarding the requesting user are identified. The first user composed message includes a post regarding exercising with Sasha at the dog park, while the second user composed message includes a post regarding wanting to take a vacation. The messages that mention the requesting user include a first message from another user and directed to the requesting user regarding going on vacation and a second message posted by yet a further user regarding going to Green Lake with the requesting user to exercise. In a further embodiment, only the messages composed by the requesting user or only messages that mention the requesting user are identified and used for determining recommendations for the requesting user.

Words are extracted from the identified messages and collected for filtering through a standard stop word list. In one embodiment, only tokens, including nouns, noun phrases, and root stems are identified and filtered. In a further embodiment, synonyms can be identified and filtered. A number of distinct words can be identified from the extracted words and placed along a vector to generate the self-profile. The distinct words are selected for inclusion in the self-profile, such that no distinct word is repeated in the self-profile, but the distinct word can be identified in one or more of the messages that are either composed by or that mention the requesting user.

Returning to the above example, the words in all four messages are extracted and stop words are removed. The stop words include commonly used words, which can differ based on a type of search engine used or a list of predetermined stop words. The words "dog," "park," "vacation," "Green Lake," "exercise," and "work" are identified as distinct words for inclusion in the requesting user's self-profile. As described above, a word selected for inclusion in the profile must be distinct from all other words in the profile. However, the distinct word can be used in one or more of the messages.

The distinct word and associated strength are listed along a vector, as the self-profile according to the formula below:

$$V_u = (v_u(w_i), \ldots, v_u(w_m)) \quad (1)$$

where m is the total number of distinct words in the identified messages and $v_u(w_i)$ describes a strength of the requesting user's interest in the keyword $w_i$. The strength of a requesting user's interest can be calculated using a term-frequency inverse-user-frequency weighing scheme (tf–idf), according to the equation below:

$$v_u(w_i) = \text{tf}_u(w_i) \cdot \text{idf}_u(w_i) \quad (2)$$

where $\text{tf}_u(w_i)$ is the number of times a word, $w_i$, has been used in the messages composed by or that mention the requesting user. The $\text{idf}_u$ is determined according to the equation below:

$$\text{idf}_u(w_i) = \log \frac{|u|}{|u_{(w_i)} + 1|} \quad (3)$$

where u is the total number of the requesting user's followees and $|u_{(w_i)}|$ is the number of the user's followees that compose messages using the word, $w_i$, in at least one message. In a further embodiment, u is the total number of other users in the social networking environment and $|u_{(w_i)}|$ is the number of the other users that compose messages using the word, $w_i$, in at least one message. Other values of u are possible, including other users who have directly communicated with the requesting user and other users who mention the requesting user in one or more messages. A high value of tf for a word indicates that the requesting user mentions the word frequently, which suggests high interest. Meanwhile, a high value of idf for a word indicates that few other users mention this word, which suggests that the word can better distinguish one user from other individuals. Returning to the above example, a strength value is assigned to each of the distinct words displayed along a vector. The strength can be measured as a percentage or an absolute number. Other measurements and methods for determining strength are possible.

Figure 7:
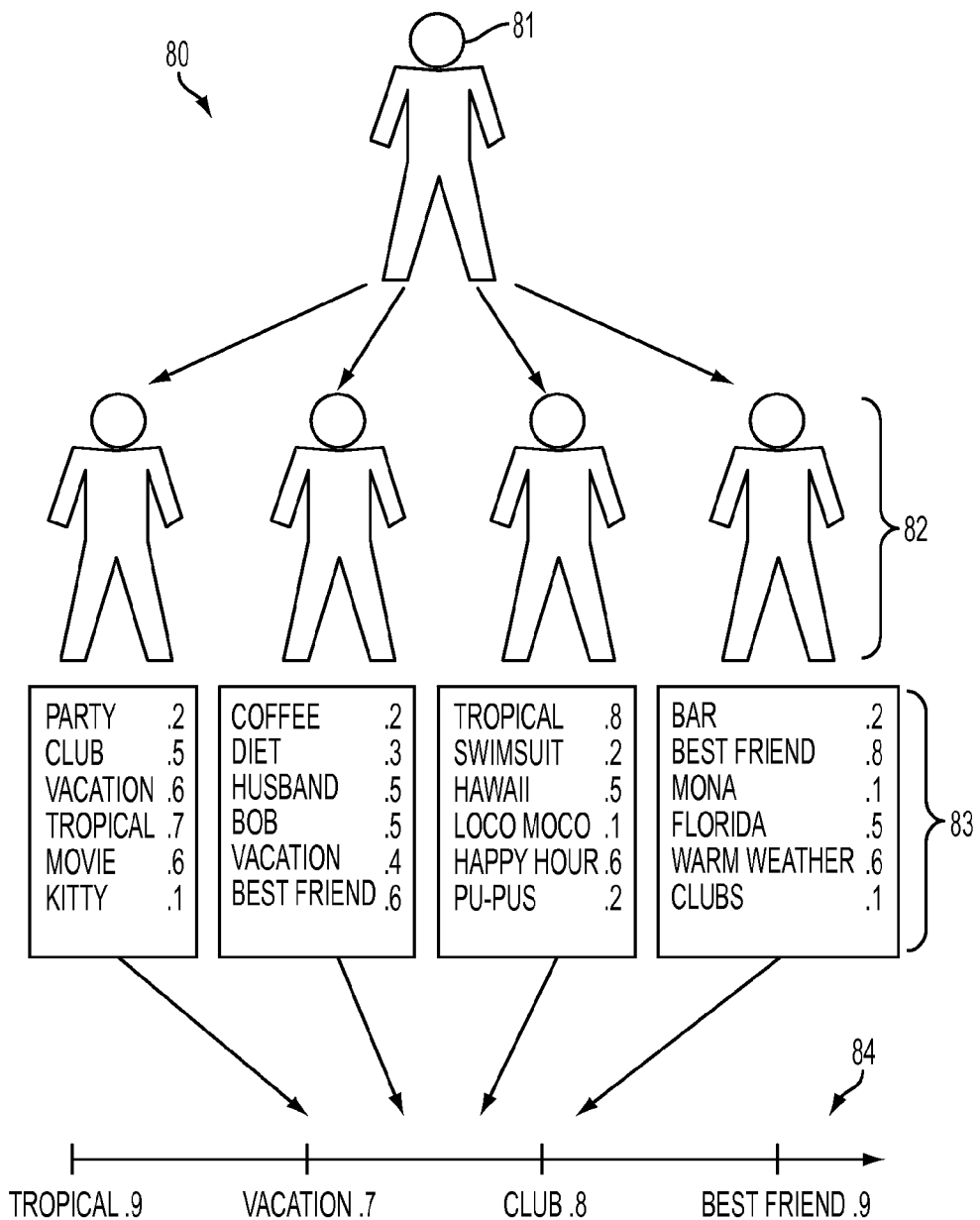
FIG. 7 is a flow diagram showing, by way of example, a method for generating a network profile.

The self-profile generated from the distinct keywords models the requesting user's interest based on content posted by the requesting user. However, a requesting user's interest can also reside in content posted by other users, including followees. A network profile can be generated based on self-profiles of the requesting user's followees. FIG. 7 is a flow diagram showing, by way of example, a method 80 for generating a network profile 84 for a requesting user 81. Followees 82 of the requesting user can be identified as all individuals with accounts to which the requesting user 81 is subscribed and following. Self-profiles 83 associated with each of the followees 82 are obtained. For example, a requesting user follows four other users, who are considered to be followees, and self-profiles are obtained for each of the four followees. For each followee, distinct words in the self-profile are ranked in decreasing order based on an associated strength of the followee's interest in that word. The distinct words with the highest interest value, indicated by an associated tf–idf value, are selected as high interest words for the followee. The followee high interest words can be selected using a threshold. The threshold can include an absolute value, a percentage, or a bounded range. Other thresholds are possible. In one embodiment, the threshold is set as 20 percent. Thus, the top 20 percent of distinct words in the ranked order are selected as high interest words for inclusion in the network profile 84. In a further embodiment, all words mentioned only by a single followee are removed from the network profile. The high interest words for each of the followees are combined and high interest words for the group of followees are selected.

Returning to the previous example, distinct words and their strengths are identified in the self-profiles for each of the four followees. In each followee self-profile, the distinct words with the highest strengths, such as those distinct words that satisfy a threshold are selected as high interest words for the followee. The high interest words for each followee is combined to generate group high interest words for which a strength of interest by the group is determined for each of the words. The group high interest words are "movie," "tropical," "club," "vacation," and "best friend." However, since the term "movie" is only mentioned in a message composed by one of the followees, the term is removed prior to generating the network profile.

The network profile can be generated from the group high interest words and their associated group strength, which can be determined using the tf–idf weighing scheme as described above, where $tf_u(w_i)$ is a number of the requesting user's followees who have a particular word $w_1$ as a high interest word. Thus, a high value of $tf_u(w_i)$ indicates that many of the requesting user's followees commonly generate messages using the particular word $w_i$. The $idf_u$ value provides a general importance of the word determined according to Equation 3, as described above.

In a further embodiment, the network profile can be generated from the requesting user's high interest words, which are also used by the followees and FOFs of the requesting user. For instance, words commonly used in messages composed by the requesting user are selected from a self-profile and identified in messages composed by the followees and FOFs of the requesting user. The strengths of the selected words can then be determined.

The network profile is generated by combining the selected high interest words for each of the requesting user's followees and the associated strengths, which are placed along a vector. Returning to the previous example, the strengths are determined for the group high interest words "tropical," "club," "vacation," and "best friend," which are placed along a vector to generate the network profile.

Figure 8:
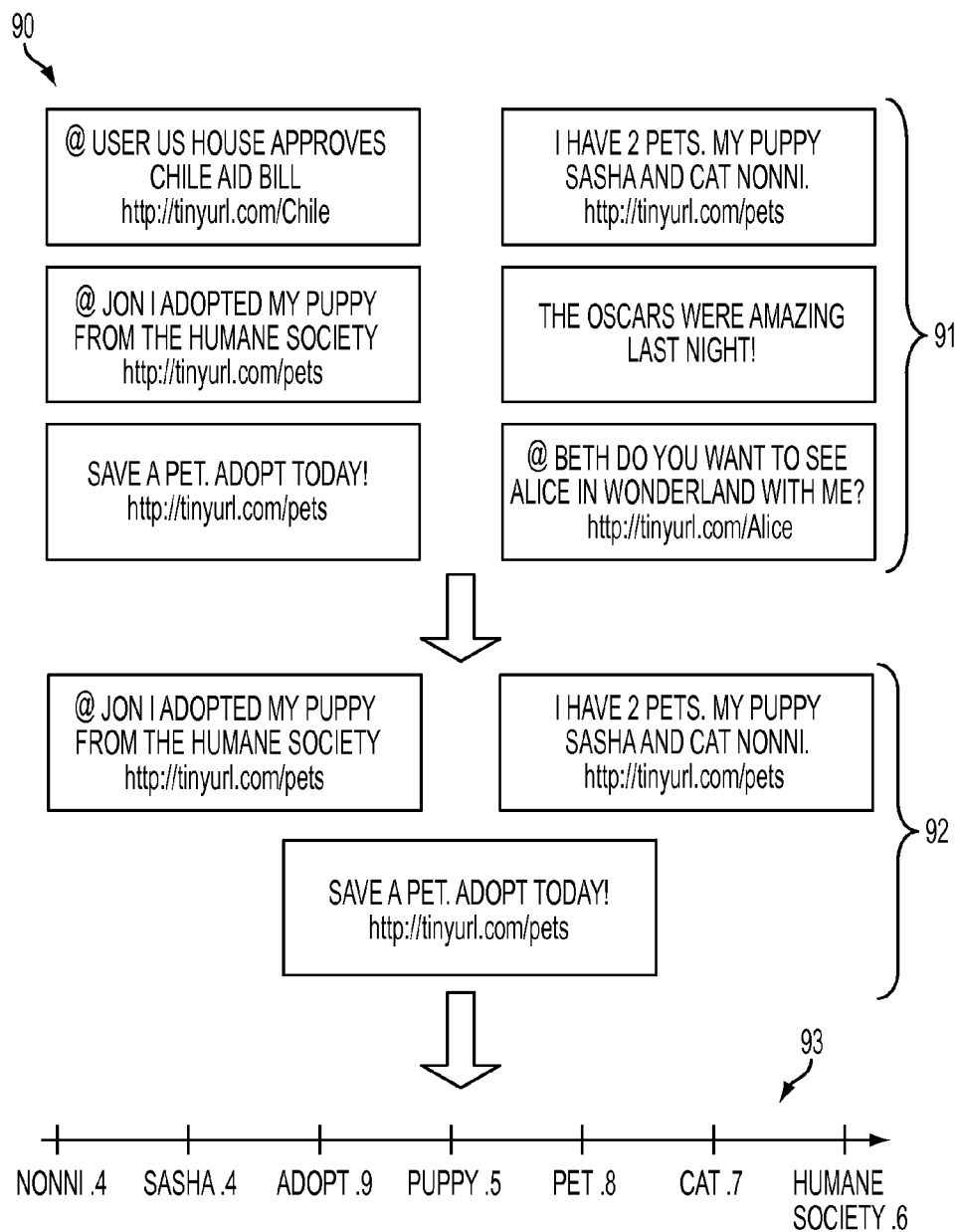
FIG. 8 is a flow diagram showing, by way of example, a method for generating a URL profile.

Content pointers, such as URLs can also be represented by a profile. FIG. 8 is a flow diagram showing, by way of example, a method 90 for generating a content pointer profile 93. The content pointer profile 93 includes keywords and associated strengths of interest located along a vector to represent topics of a content pointer, such as a URL. Other content pointers are possible, including indexes, file names, search terms, and attachments. The topics can be determined from messages that include the content pointer. The content pointer profile is generated similarly to the content profile using the tf–idf weighing scheme described above with reference to FIG. 6. For example, messages 91 are reviewed to identify those messages that include a particular content pointer 92. The identified messages 92 are then analyzed to extract the words contained in each message. The extracted words are filtered through a standard stop word list to remove common words. In one embodiment, only word tokens, including nouns, noun phrases, and root stems are identified and filtered. In a further embodiment, synonyms can be identified and filtered. A number of distinct words can be identified from the extracted words and placed along a vector to generate the content pointer profile 93. The distinct words are selected for inclusion in the content pointer profile 93, such that no distinct word is repeated in the content pointer profile, but the distinct word can be identified in one or more of the messages that mention the content pointer. Based on the above example, the terms "adopt," "puppy," "Sasha," "cat," "Nonni," "Humane Society," and "pet" are selected as distinct words for inclusion in the content pointer profile along with an associated strength of interest.

The strength of interest associated with each distinct word can be based on use of that distinct word to describe the content pointer, which can be determined according to the tf–idf weighing scheme described above. However, the value for $tf_u(w_i)$ is a number of times a word has been used to describe the content point in the associated messages. In one embodiment, the more often a word is used to describe a content pointer, the more likely the word is relevant to the content pointer. Additionally, the $idf_u$ value provides a general importance of the word, which is determined according to Equation 3, as described above. Returning to the above example, interest scores are determined for each of the selected distinct words and placed along a vector to generate the content pointer profile. In a further embodiment, when a content pointer is only included in a small number of messages, short message term expansion is applied to identify additional words for inclusion in the URL profile. During term expansion, tokens, such as nouns, noun phrases and root stems are extracted from a message having a content pointer, and a query is generated based on the extracted tokens. The query is applied to a set of documents, such as Web-based documents, or remotely stored or locally stored electronic documents. The documents that match one or more tokens of the search query are identified as search results. The search results can be analyzed for identifying salient terms via a search engine or using tf–idf. If tf–idf is applied, the tokens appearing in the search result documents having the highest tf–idf values are selected as salient terms. The identified salient terms can be added to the content pointer profile as distinct words. Short message term expansion is further described in commonly-assigned U.S. patent application Ser. No. 12/646,810, entitled "System and Method For Identifying Topics For Short Text Communications," pending, filed Dec. 23, 2009, the disclosure of which is incorporated herein by reference.

Figure 9:
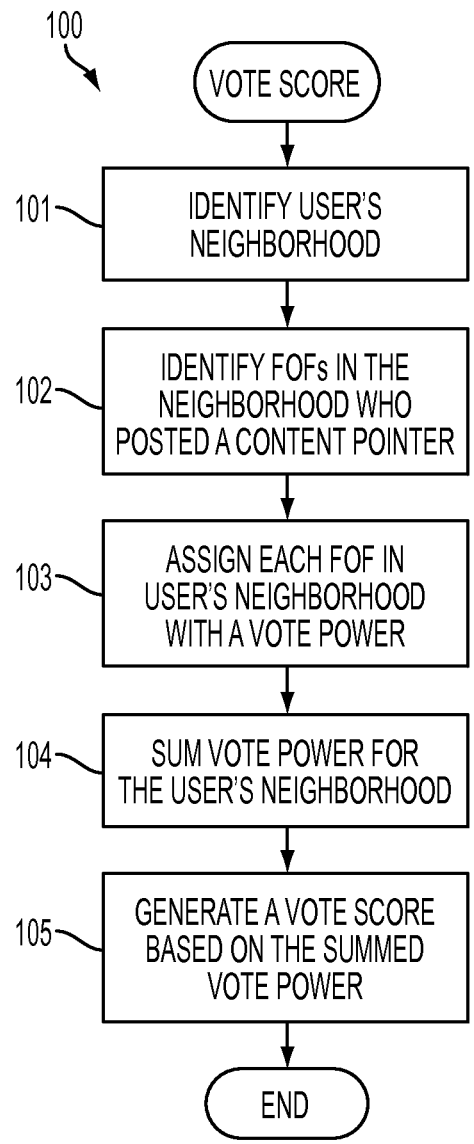
FIG. 9 is a flow diagram showing, by way of example, a method for assigning scores to URLs using a neighborhood of individuals.

In addition to scoring content pointers based on profiles, a poster-based scoring method can also be used. FIG. 9 is a flow diagram showing, by way of example, a method 100 for assigning scores to URLs using poster-based scoring. A poster neighborhood associated with a requesting user is identified (block 101). The poster neighborhood can include followees of a requesting user's followees (FOF). Other types of neighborhoods are possible. A FOF has an account profile that is followed by the requesting user's followee, who in turn in followed by the requesting user. Individual FOFs that posted a particular content pointer, such as a URL, in a message are identified (block 102). The identified FOFs are each assigned a vote score (block 103) based on a trustworthiness of the FOF and a number of messages generated by that FOF.

The trustworthiness vote score can include an absolute number or percentage, which can be based on a number of messages exchanged with the user, a number of other individuals shared between the user and the individual, and a similarity of message content composed by the user and the individual. Other determinations of trustworthiness are possible. Meanwhile, the number of messages generated by an FOF can be calculated over a predetermined amount of time or within a bounded range of time. The vote power assigned can be proportional to the logarithm of the number of the requesting user's followees who follow a particular FOF and also proportional to the logarithm of the average time interval between messages generated by the particular FOF. Thus, in one embodiment, the FOFs that generate fewer messages are assigned a higher vote power, while the FOFs that frequently generate messages are assigned a lower vote power. Additionally, a FOF that is followed by many of a requesting user's followees can be considered more trustworthy than FOFs followed by fewer of the requesting user's followees. Accordingly, the more followees of the requesting user that follow the FOF, results in a higher voting power. In a further embodiment, if the particular content pointer has not been mentioned by any of the FOFs, a vote score commensurate with mention by a single FOF with the lowest voting power is assigned. Other methods for assigning the vote score are possible.

Figure 10:
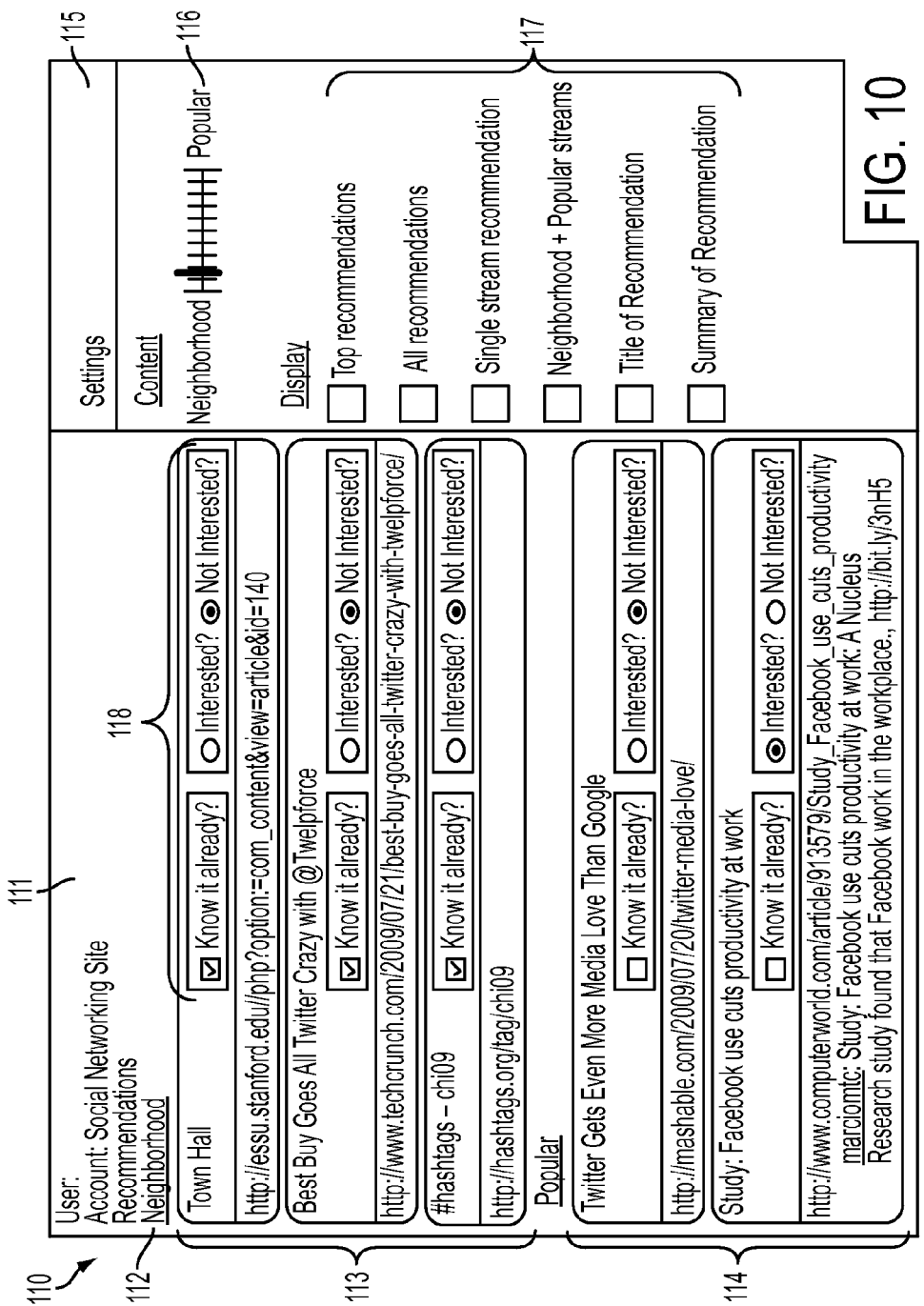
FIG. 10 is a screenshot showing, by way of example, a Web page displaying recommendations for a user.

Once determined, the vote power for each of the FOFs are summed (block 104) to generate a vote score (block 105) for the content pointer. Returning to the description with respect to FIG. 3, all candidate content pointers are scored via relevance ranking or social ranking and then ranked based on the associated scores. If both a relevance ranking score and a social ranking score have been assigned to a URL, the rank is based on a combination of the relevance score and the vote score for that URL. A rank threshold is applied to the scores of the ranked content pointers and the content pointers with scores that satisfy the rank threshold are selected as recommendations. Upon selection, the recommendations can be provided to the requesting user for review. The recommendations can include only the URL, or the URL and the associated messages. The recommendations provided to a requesting user can be accessed and displayed on a recommendation Web page. FIG. 10 is a screenshot 110 showing, by way of example, a Web page 111 displaying recommendations 112, 113 for a requesting user. The recommendations 112, 113 can be provided as a single list or alternatively, the recommendations can be separately presented based on the type of recommendation. In one embodiment, the recommendations can be classified as content recommendations 113, which are based on a neighborhood candidate set of content pointers, or popular recommendations 114 based on a popular candidate set of content pointers. As described above with reference to FIG. 3, a set of candidate content pointers for possible selection as recommendations can be generated based on a neighborhood of the requesting user or on a popularity of that content within the social networking environment. Recommendations selected from a neighborhood candidate set are generally related to information that is already known or familiar to the requesting user, whereas recommendations selected from a popular candidate set tend to include new or contrary subject matter compared to information received by the requesting user.

Each of the displayed recommendations includes relevancy boxes 118, which can be filled by the requesting user to indicate whether the content of the recommendation was previously known, or whether the requesting user is interested or disinterested in the content of the recommendation. The relevancy boxes 118 can include check boxes or finable boxes, as well as other types of formats for receiving information from the requesting user. The information obtained from the requesting user via the relevancy check boxes can be used to update the requesting user's content profile and adjust the voting power.

The presentation of the recommendations can be determined by the requesting user via a set of presentation tools 115 or automatically determined. The presentation tools can include a content sliding bar 116 and display check boxes 117. The content sliding bar 116 can allow a requesting user to request a range of content included in the recommendations. At one extreme of the content sliding bar, all recommendations from a network candidate set of URLs will be provided. At the other extreme, all recommendations selected from a popular candidate set of URLs will be provided. In the middle, a near equal mix of content recommendations and popular recommendations will be provided.

In one embodiment, the content range of selecting network and popular recommendations are included in a single selectable sliding bar control. However, separate user-adjustable sliding bar controls are possible. Other types of controls are possible, including separate or combined rotary or gimbel knobs, slider bars, radio buttons, and other user input mechanisms that allow continuous or discrete selection over a fixed range of rotation, movement, or selection. The display check boxes 117 can include displaying the top recommendations, all recommendations, a single stream of recommendations, separate lists of recommendations for content and popular recommendations, a title of each recommendation, or a summary of each recommendation. Other display factors are possible.

In a further embodiment, a requesting user can logon to multiple recommendation Web pages. Each Web page can be representative of a source of the recommendations, such as a social networking site, email, or RSS feed. Other sources are possible. At a minimum, the source must be able to identify the users, the content being communicated, and a history of the communications.

In yet a further embodiment, spreading activation can be used to propagate through a social network or other content pointer environment. For example, to identify recommendations for a requesting user in an environment with content pointers, other users in the environment, such as followees of FOFs can be considered. However, the further removed the other users are from the requesting user, the less weight is afforded during consideration. Spreading activation can be used to generalize the other users.

Although identifying recommendations has been described above with respect to social networking environments and URLs, other environments and content pointers are possible. The environments can include email and databases. In an email environment, the content pointer can include attachments, while the content pointer in a database environment can include file names or an index. In an email environment, content profiles and content pointer profiles can be generated based on the content of an email. Words are extracted from the emails to generate the profile vectors and word strengths can be based on the contacts in a requesting user's address book or contacts that have directly communicated with the requesting user. Other environment and content pointers are possible.

While the invention has been particularly shown and described as referenced to the embodiments thereof, those skilled in the art will understand that the foregoing and other changes in form and detail may be made therein without departing from the spirit and scope of the invention.

What is claimed is:

1. A method for recommending interesting content, comprising:

obtaining a content profile comprising a vector of user words extracted from messages associated with a user;

identifying one or more Uniform Resource Locators (URLs) in a plurality of messages generated by other users comprising followees that the user follows and further followees that are followed by the followees;

generating one or more content pointer profiles each comprising a vector of words associated with one of the URLs located within at least one of the plurality of messages by extracting the words from the at least one message from the other users that include that URL and combining the extracted words as the vector of words;

comparing the content profile with each of the content pointer profiles and determining a relevance score for the URLs associated with the content pointer profiles by calculating a similarity between the vector of user words and the vector for each URL;

determining a vote score for each of the URLs, comprising:
assigning a composition power to each of the other users associated with the plurality of messages that include one of the URLs based on a frequency of messages generated by that other user;
assigning a trust power to each of the other users associated with the plurality of messages that include the URL based on a trustworthiness of that other user;
determining a vote power for each of the other users associated with the plurality of messages that include the URL by combining the composition power and the trust power for that other user; and
generating a vote score for each of the URLs by summing the vote power for the other users associated with the plurality of messages that include that URL;

combining the vote score with the relevance score as a rank score for each of the URLs;
ranking the URLs based on the rank score; and
applying a threshold to the URLs and selecting the URLs that satisfy the threshold as the most relevant URLs to the user.

2. The method according to claim 1, wherein the content profile comprises one of a self-profile and a network profile.

3. The method according to claim 2, further comprising:
generating the self-profile, comprising:
extracting words from the messages associated with the user and generating a list of the extracted words;
selecting one or more of the extracted words for inclusion in the self-profile and determining a strength of each selected word; and
placing the selected words and associated strengths along the vector as the self-profile.

4. The method according to claim 2, further comprising:
generating the network profile, comprising:
identifying profiles of individuals associated with the user, wherein each profile comprises words and associated strengths for that individual;
applying a threshold to each profile and selecting the words that satisfy the threshold;
combining the selected words from each individual profile and determining a strength for each selected word; and
placing the selected words and associated strengths along a vector as the network profile.

5. The method according to claim 1, further comprising:
generating the content pointer profile for at least one of the URLs, comprising:
selecting one or more of the words for inclusion in the content pointer profile and determining a strength of each selected word; and
placing the selected words and associated strengths along a vector as the content pointer profile.

6. The method according to claim 1, further comprising:
determining the trust power based on at least one of a number of messages exchanged between the user and that other user, a number of other users shared between the user and that other user, and a similarity of content composed by the user and that other user.

7. A method for recommending interesting content, comprising:
receiving, from a user, a request for recommendations comprising interesting messages;
identifying messages from a neighborhood of individuals associated with the user, each message comprising a Uniform Resource Locator (URL), wherein the neighborhood comprises followees that the user follows and further followees that are followed by the followees;
assigning a composition power to each of the individuals based on a frequency of messages generated by that individual;
assigning a trust power to each of the individuals based on a trustworthiness of that individual;
determining a vote power for each individual by combining the composition power and the trust power;
generating a vote score for each of the URLs by summing the vote power for those individuals associated with the messages that include that URL;
applying a threshold to the vote scores and selecting the URLs that satisfy the threshold as the recommendations; and
presenting the recommendations to the user.

8. The method according to claim 7, further comprising:
determining the trust power for each individual based on at least one of a number of messages exchanged between the user and that individual, a number of other individuals shared between the user and that individual, and a similarity of content composed by the user and that individual.

9. The method according to claim 7, further comprising:
assigning a high composition power to those individuals that generate a low number of messages and assigning a low composition power to those individuals that generate a high number of messages.

10. A method for identifying interesting content, comprising:
generating a set of candidate Uniform Resource Locators (URLs) selected from messages within one or more information streams;
determining a relevance score for each of the candidate URLs based on a set of messages generated by individuals associated with a user comprising followees that the user follows and further followees that are followed by the followees;
determining a vote score for each of the candidate URLs based on two or more of the individuals associated with the user, comprising:
identifying those messages comprising one such candidate URL from a neighborhood of the messages by the two or more individuals;
assigning a composition power to each of the two or more individuals based on a frequency of the messages generated by that individual;
assigning a trust power to each of the two or more individuals based on a trustworthiness of that individual;
determining a vote power for each of the two or more individuals by combining the composition power and the trust power; and
generating the vote score for each of the candidate URLs by summing the vote powers for the two or more individuals associated with the messages that include that candidate URL;
combining the relevance scores and the vote scores for each of the candidate URLs as a combined score and ranking the candidate URLs based on the combined scores; and
applying a threshold to the combined scores and selecting the candidate URLs that satisfy the threshold as recommendations.

11. The method according to claim 10, further comprising:
calculating the relevance score, comprising:
- obtaining a content profile comprising a vector of words associated with the user;
- obtaining one or more content pointer profiles each comprising a vector of words associated with one of the candidates URLs; and comparing the content profile with each of the content pointer profiles and determining the relevance score by calculating a similarity between the vector of words associated with the user and the vector of words associated with the URL for that content pointer profile.

12. The method according to claim 11, further comprising:
generating the content pointer profile for one of the URLs, comprising:
- extracting words from the messages within which the URL is located;
- selecting one or more of the extracted words for inclusion in the content pointer profile and determining a strength of each selected word; and
- placing the selected words and associated strengths along a vector as the content pointer profile.

13. The method according to claim 11, wherein the content profile comprises one of a self-profile and a network profile.

14. The method according to claim 13, further comprising:
generating the self-profile, comprising:
- extracting words from the messages associated with the user and generating a list of the words;
- selecting one or more of the extracted words for inclusion in the self-profile and determining a strength of each selected word; and
- placing the selected words and associated strengths along the vector as the self-profile.

15. The method according to claim 13, further comprising:
generating the network profile, comprising:
- identifying profiles of the individuals associated with the user, wherein each profile comprises words and associated strengths for that individual;
- applying a threshold to each profile and selecting the words that satisfy the threshold;
- combining the selected words from each individual profile and determining a strength for each selected word; and placing the selected words and associated strengths along a vector as the network profile.

16. The method according to claim 10, further comprising:
determining the trust power for each of the two or more individuals based on at least one of a number of messages exchanged between the user and one such individual, a number of other individuals shared between the user and the one such individual, and a similarity of content composed by the user and the one such individual.

* * * * *